(12) United States Patent
Frieventh Cienfuegos et al.

(10) Patent No.: US 10,948,576 B2
(45) Date of Patent: Mar. 16, 2021

(54) SURFACE DIRTINESS DETECTION

(71) Applicant: Ford Global Technologies, LLC, Dearborn, MI (US)

(72) Inventors: Rodrigo Frieventh Cienfuegos, Toluca (MX); Oswaldo Perez Barrera, Texcoco (MX); Hedy H. Morales Bolanos, Naucalpan (MX); David Franco Lopez Rubio, Lerma (MX)

(73) Assignee: Ford Global Technologies, LLC, Dearborn, MI (US)

( * ) Notice: Subject to any disclaimer, the term of this patent is extended or adjusted under 35 U.S.C. 154(b) by 599 days.

(21) Appl. No.: 15/897,496

(22) Filed: Feb. 15, 2018

(65) Prior Publication Data

US 2019/0250259 A1  Aug. 15, 2019

(51) Int. Cl.
*G01S 7/481* (2006.01)
*G01S 7/497* (2006.01)
*G01S 17/93* (2020.01)
*G01S 17/04* (2020.01)
*G01S 17/931* (2020.01)

(52) U.S. Cl.
CPC ............ *G01S 7/497* (2013.01); *G01S 7/4811* (2013.01); *G01S 7/4813* (2013.01); *G01S 17/04* (2020.01); *G01S 17/931* (2020.01); *G01S 2007/4975* (2013.01); *G01S 2007/4977* (2013.01)

(58) Field of Classification Search
CPC ...... G01S 7/497; G01S 7/4811; G01S 7/4813; G01S 17/04; G01S 17/931; G01S 2007/4977; G01S 2007/4975
USPC ....................................................... 356/5.01
See application file for complete search history.

(56) References Cited

U.S. PATENT DOCUMENTS

| 5,666,037 | A | 9/1997 | Reime |
| 6,153,995 | A | 11/2000 | Tanaka |
| 2008/0105837 | A1 | 5/2008 | Mack |
| 2011/0128543 | A1 | 6/2011 | Choi |

FOREIGN PATENT DOCUMENTS

| DE | 19951831 A1 | 5/2001 |
| EP | 1457763 A2 | 9/2004 |

OTHER PUBLICATIONS

Electronics Hub: "IO Devices IR Sensor", Feb. 2, 2015 (24 pages).

*Primary Examiner* — Daniel L Murphy
(74) *Attorney, Agent, or Firm* — Frank A. MacKenzie; Bejin Bieneman PLC

(57) ABSTRACT

A system includes a plurality of photodiode sensors spaced from one another and mounted to a reflective surface, a transparent layer spaced from and substantially parallel to the reflective surface, and a plurality of photodiode transmitters at least one of mounted to the reflective surface and disposed between the reflective surface and the transparent layer.

20 Claims, 7 Drawing Sheets

SURFACE DIRTINESS DETECTION

BACKGROUND

A vehicle may include one or more object detection sensors such as Light Detection and Ranging (LIDAR) sensors to detect objects, e.g., in an area outside the vehicle. A sensor for detecting objects outside a vehicle may be mounted to a vehicle exterior. For example, a sensor may be mounted to a vehicle roof, pillar, etc. A sensor such as a LIDAR sensor is typically subject to environmental conditions, e.g., dirt, dust, etc., that can impair operation of the sensor.

DETAILED DESCRIPTION

Introduction

Figure 1:
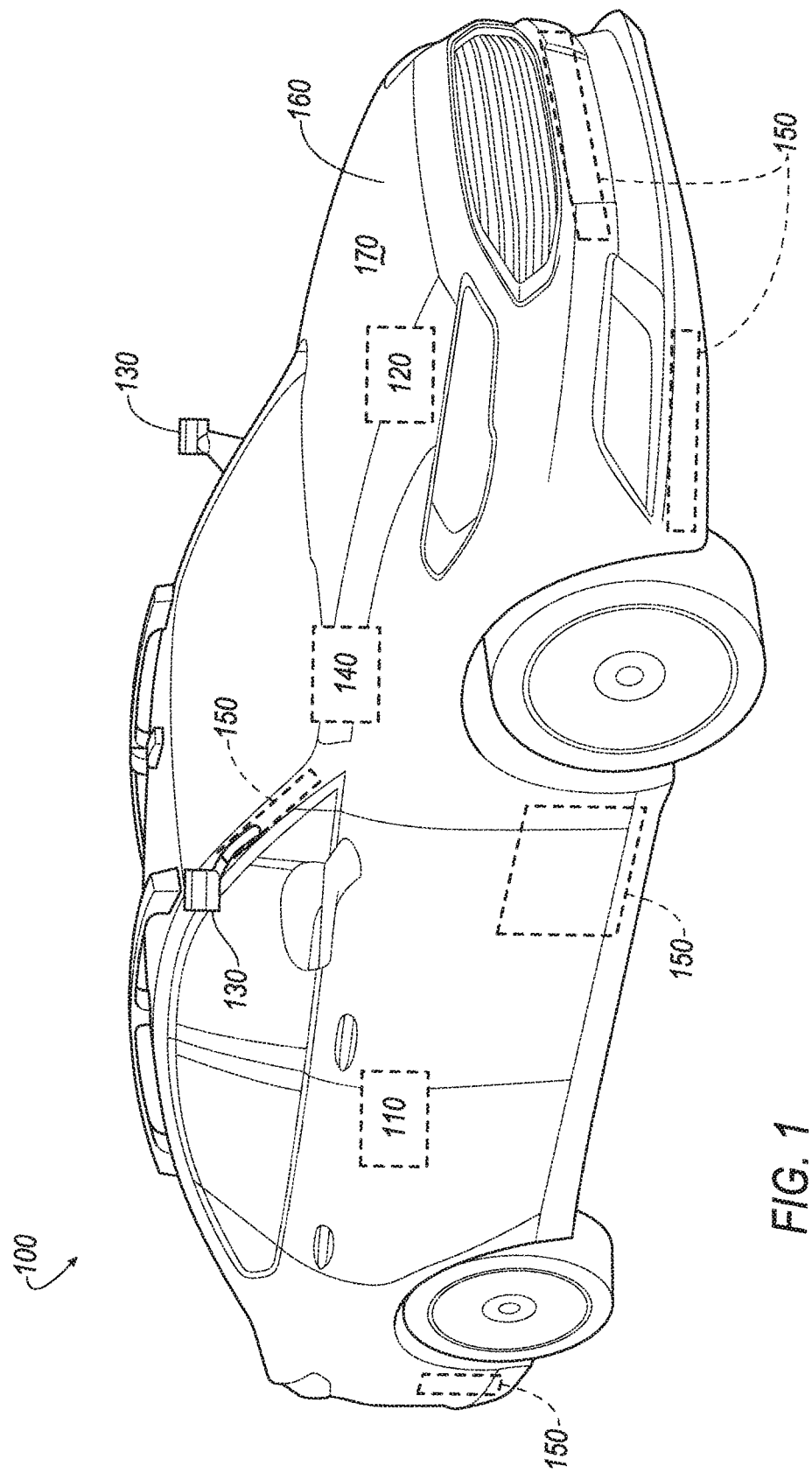
FIG. 1 is a diagram illustrating an example vehicle with multiple smudge detectors.

Disclosed herein is a system including a plurality of photodiode sensors spaced from one another and mounted to a reflective surface, a transparent layer spaced from and substantially parallel to the reflective surface, and a plurality of photodiode transmitters at least one of mounted to the reflective surface and disposed between the reflective surface and the transparent layer.

Receiving surfaces of the plurality of photodiode sensors may be directed toward the transparent layer.

The transparent layer may be transparent to a wavelength of an optical signal of the plurality of photodiode transmitters.

At least one of the plurality of photodiode transmitters and the plurality of photodiode sensors may be arranged in a circular pattern.

The system may further include a computer programmed to actuate at least one of the plurality of the photodiode transmitters to generate an optical signal, determine an intensity of a received reflection of the optical signal based on data received from at least one of the plurality of the photodiode sensors, and identify a dirty area on an outer surface of the transparent layer, wherein the outer surface is spaced from the reflective surface.

The computer may be further programmed to identify the dirty area upon determining that the determined intensity exceeds an intensity threshold.

The computer may be further programmed to actuate the plurality of photodiode transmitters asynchronously, wherein an intensity threshold associated with each of the photodiode sensors is based on a location of the photodiode sensor relative to a currently active photodiode transmitter.

The computer may be further programmed to determine at least three intensities of received optical signals based on data received from at least three of the plurality of photodiode sensors, and identify dimensions of the dirty area based on the at least three intensities of the received optical signal.

The computer may be further programmed to actuate a first group of the photodiode transmitters, determine first intensities of received reflections of optical signals outputted by the first group of the photodiode transmitters, actuate a second group of the photodiode transmitters, determine second intensities of received reflections of optical signals outputted by the second group of the photodiode transmitters, and determine dimensions of the dirty area based on the first and second intensities.

The computer may be further programmed to identify a material covering the dirty area based on at least one of a wavelength and intensity of the received reflection.

The computer may be further programed to identify a location of the dirty area based on determined intensities of reflected optical signal from at least three of the plurality of the photodiode sensors.

Further disclosed herein is a system including a plurality of means for sensing light spaced from one another and mounted to a reflective surface, a transparent layer spaced from and substantially parallel to the reflective surface, and a plurality of means for transmitting light at least one of mounted to the reflective surface and disposed between the reflective surface and the transparent layer.

The system may further include means for actuating at least one of the plurality of the photodiode transmitters to generate an optical signal, means for determining an intensity of a received reflection of the optical signal based on data received from at least one of the plurality of the photodiode sensors, and means for identifying a dirty area on an outer surface of the transparent layer, wherein the outer surface is spaced from the reflective surface.

The system may further include means for identifying the dirty area upon determining that the determined intensity exceeds an intensity threshold.

The system may further include means for actuating the plurality of photodiode transmitters asynchronously, wherein an intensity threshold associated with each of the photodiode sensors is based on a location of the photodiode sensor relative to a currently active photodiode transmitter.

The system may further include means for determining at least three intensities of received optical signals based on data received from at least three of the plurality of photodiode sensors, and means for identifying dimensions of the dirty area based on the at least three intensities of the received optical signal.

The system may further include means for actuating a first group of the photodiode transmitters, means for determining first intensities of received reflections of optical signals outputted by the first group of the photodiode transmitters, means for actuating a second group of the photodiode transmitters, means for determining second intensities of received reflections of optical signals outputted by the second group of the photodiode transmitters, and means for determining dimensions of the dirty area based on the first and second intensities.

Further disclosed herein is a computer including a processor and a memory. The memory stores instructions executable by the processor to actuate a plurality of photodiode sensors spaced from one another and mounted to a reflective surface to sense received light, and actuate a plurality of photodiode transmitters, at least one of mounted to the reflective surface and disposed between the reflective surface and a transparent layer, to transmit light, wherein the transparent layer is spaced from and substantially parallel to the reflective surface.

The computer may be further programmed to actuate at least one of the plurality of the photodiode transmitters to generate an optical signal, determine an intensity of a received reflection of the optical signal based on data received from at least one of the plurality of the photodiode sensors, and identify a dirty area on an outer surface of the transparent layer, wherein the outer surface is spaced from the reflective surface.

The computer may be further programmed to actuate a first group of the photodiode transmitters, determine first intensities of received reflections of optical signals outputted by the first group of the photodiode transmitters, actuate a second group of the photodiode transmitters, determine second intensities of received reflections of optical signals outputted by the second group of the photodiode transmitters, and determine dimensions of the dirty area based on the first and second intensities.

Further disclosed is a computing device programmed to execute any of the above method steps.

Yet further disclosed is a computer program product, comprising a computer readable medium storing instructions executable by a computer processor, to execute any of the above method steps.

Exemplary System Elements

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI) 140.

The vehicle 100 may include a body 160 with an exterior surface 170. The vehicle 100 body 160 may include a roof, a floor, and a plurality of pillars. The body 160 may have a uni-body construction, a body-on-frame construction, or any other suitable construction. The body 160 exterior surface 170 may be formed of metal, e.g., steel, aluminum, etc., hard plastic, etc.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode, an operator controls the vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or may receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. For example, the sensors 130 may include one or more camera, radar, infrared, and/or LIDAR sensors 130 disposed in the vehicle 100 and/or on the vehicle 100 providing data encompassing at least some of the vehicle 100 exterior. The data may be received by the computer 110 through a suitable interface such as is known. A LIDAR sensor 130 may be mounted to the exterior surface 170 of the vehicle, e.g., disposed on a pillar, roof, etc., of the vehicle 100, and may provide object data including relative locations, sizes, and shapes of objects such as other vehicles surrounding the vehicle 100. A vehicle 100 computer 110 may receive the object data and operate the vehicle in an autonomous and/or semi-autonomous mode based at least in part on the received object data.

The HMI 140 may be configured to receive user input, e.g., during operation of the vehicle 100. For example, a user may select a mode of operation, e.g., an autonomous mode, by inputting a requested mode of operation via a HMI 140. Moreover, a HMI 140 may be configured to present information to the user. Thus, a HMI 140 may be located in a passenger compartment of the vehicle 100. In an example, the computer 110 may output information indicating that a vehicle 100 mode of operation such as an autonomous mode is deactivated due to an event, e.g., a LIDAR sensor 130 sensor blockage that impairs its object detection operation.

As a result of being exposed to environmental conditions such as rain, dust, etc., the exterior surface 170 may be covered by obstructive material, referred to herein as a "smudge", e.g., rain, snow, ice, dirt, dust, etc. The obstructive material on the exterior surface 170 may impair vehicle 100 sensors 130 operation and/or cause an unpleasant appearance for the vehicle 100. The vehicle 100 may include one or more smudge detectors 150 to detect whether the vehicle 100 exterior surface 170 is dirty (i.e., covered by obstructive material). The smudge detectors 150 may be mounted to different locations of the exterior surface 170, e.g., front and rear bumpers, pillars, etc., as shown in FIG. 1.

Figure 2:
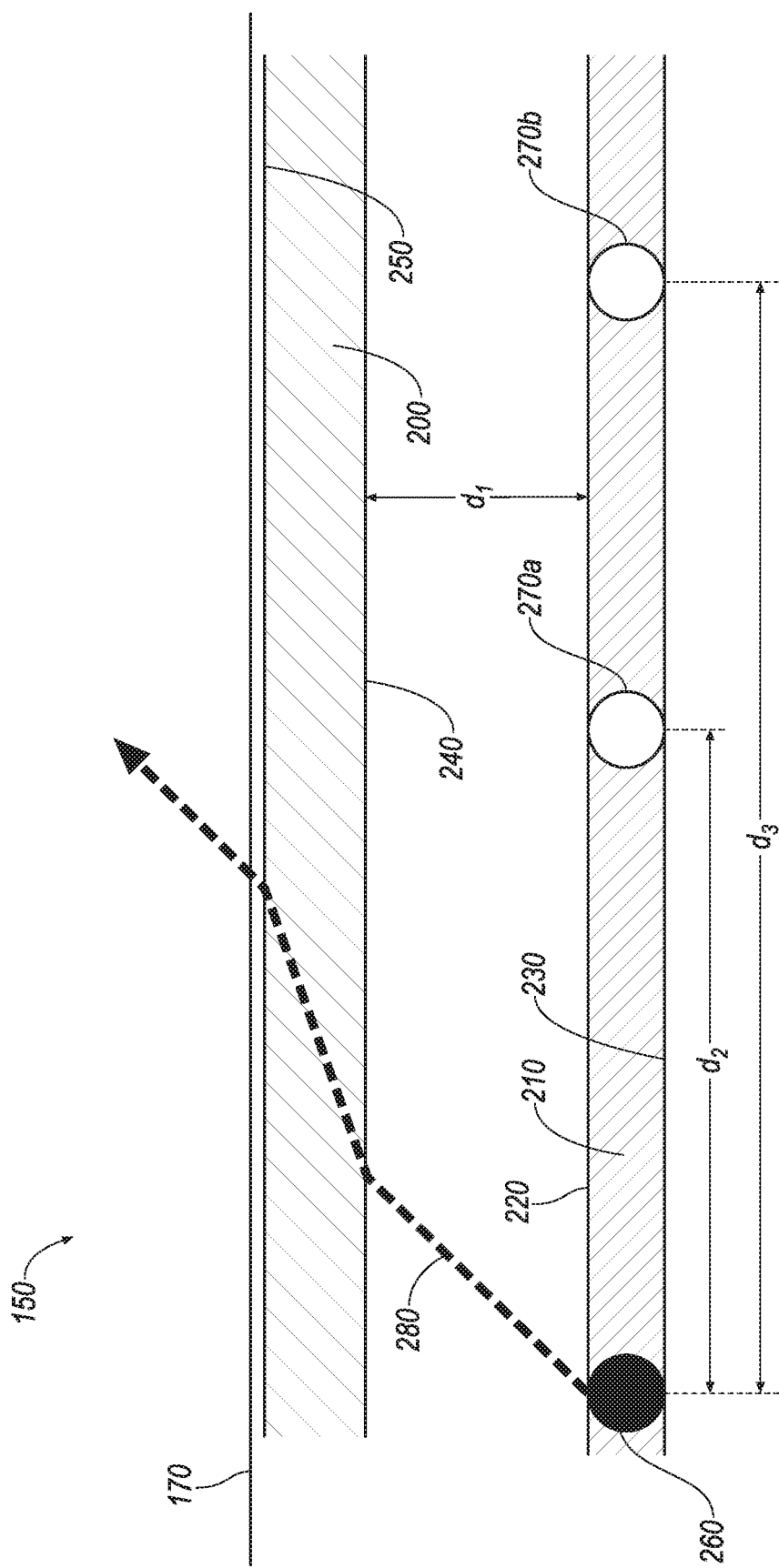
FIG. 2 is a diagram showing a side view of the example smudge detector.

As shown in FIG. 2, an example smudge detector 150 can include a plurality of photodiode sensors (or photodiode receivers) 270 spaced from one another and mounted to a reflective surface 220. The smudge detector 150 can further include a transparent layer 200 spaced from and substantially parallel to the reflective surface 220, and a plurality of photodiode transmitters 260. Each transmitter 260 is at least one of mounted to the reflective surface 220 and disposed between the reflective surface 220 and the transparent layer 200.

In the present context, "substantially parallel" means either (i) a bottom surface 240 of the transparent layer 200 and the reflective surface 220 of a reflective layer 210 are substantially flat and parallel, or (ii) a distance $d_1$ between the surfaces 220, 240 is constant across the surfaces 220, 240, even if the surface 220, 240 are not flat, e.g., each have a curved shape, e.g., on a vehicle 100 bumper.

A photodiode transmitter 260 is a semi-conductor component, e.g., a light emitting diode (LED), that can generate light based on an electric actuation, e.g., by applying an electric voltage to a plurality of pins of the transmitter 260. The photodiode transmitters 260 may be directed away from the reflective layer 210 toward the transparent layer 200. In one example, the photodiode transmitters 260 may be mounted to the reflective layer 210. The vehicle 100 computer 110 may be programmed to actuate the photodiode transmitters 260 to transmit an infrared light beam 280 that is transmitted through the transparent layer 200.

As shown in FIGS. 1-2, the smudge detector(s) 150 may be attached to an exterior surface 170 of the vehicle 100. Thus, in one example, an outer surface 250 of the transparent layer 200 may be mounted to the exterior surface 170 of the vehicle 100. As shown in FIG. 2, the infrared light beam 280 may be refracted upon entering the transparent layer 200 and/or upon exiting the exterior surface 170 of the transparent layer 200 to an exterior of the vehicle 100. In one example, to pass the infrared light beam 280 to the exterior of the vehicle 100, a portion of the exterior surface 170 that is placed on the outer surface 250 may be transparent to the wavelengths of the light beam 280. Additionally or alternatively, the smudge detector 150 may be mounted on top of the exterior surface 170. A refraction of the light beam 280, e.g., including an angle of refraction, is based on refraction indices of the materials at a location of refraction. In other words, a refraction of light passing from a first material to a second material may be based on a first refractive index of the first material and a second refractive index of the second material.

The transparent layer 200 may be formed of a material, e.g., N-BK7 glass, with a high transmittance for infrared light. An infrared light beam may have a wavelength from 0.75 to 3 micrometers ($\mu$m). A transmittance of a material, e.g., of the transparent layer 200, is an effectiveness of the material in transmitting radiant light, e.g., an optical signal such as the infrared light beam(s) 280. The transmittance may be specified as a percentage of light expected to pass through a material.

A photodiode sensor 270 is an electronic component that can detect a light beam. In one example, a photodiode sensor 270 may output an electric current and an amount of the outputted electric current varies based on an intensity and/or wavelength of received light beams. The photodiode 270 may be directed toward the transparent layer 200.

Figure 3:
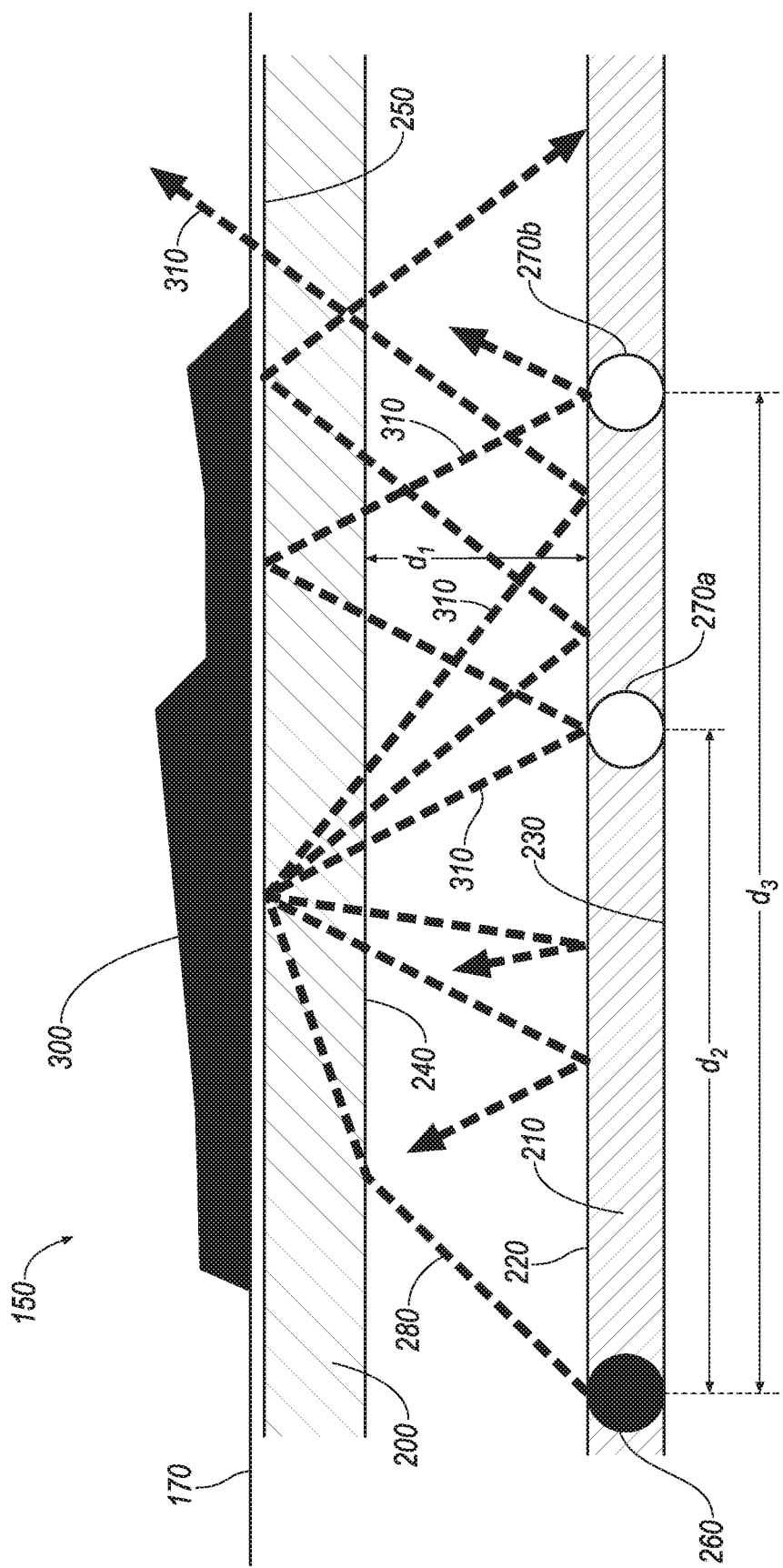
FIG. 3 is a diagram showing a side view of the smudge detector with a dirty area.

As shown in FIG. 3, a dirty area 300, i.e., covered by an obstructive material, on the vehicle 100 exterior surface 170 can block a passage of the infrared light beam 280 to the exterior of the vehicle 100. A light beam 280 may be reflected from the dirty area 300 and may generate one or more reflected light beams 310. The reflective layer 210 may reflect the reflected light beams 310 back toward the transparent layer 200. In one example, shown in FIG. 3, the light beams 310 may be reflected a plurality of times between the dirty area 300 and the reflective surface 220. Additionally or alternatively, the light beams 310 may be transmitted to the exterior of the vehicle 100 if through repetitive reflection on the reflective surface 220, the light beam 310 reaches an area of the outer surface 250 which is not dirty, i.e. not covered by obstructive material. When a reflected light beam 310 by the reflective surface 220 hits an area not covered by the obstructive material, then the reflected light beam 310 may exit to the exterior of the vehicle 100 by passing through the transparent layer 200, e.g., as shown at the far right of FIG. 3. As shown in FIG. 3, the infrared light beam 280 may be refracted upon entering the transparent layer 200. Additionally or alternatively, the reflected light beam 310 may be refracted upon entering and/or exiting the transparent layer 200, although for convenience not shown in FIG. 3.

With reference to FIG. 3, the computer 110 may be programmed to actuate the photodiode transmitter(s) 260 to generate an optical signal, e.g., the light beam 280, to determine an intensity of a received reflected light beam 310 of the optical signal based on data received from at least one of the plurality of the photodiode sensors 270a, 270b. The computer 110 can be programmed to identify the dirty area 300 on the outer surface 250 of the transparent layer 200.

The computer 110 may be programmed to identify the dirty area 300 upon determining that a determined intensity of received light at the photodiode sensor(s) 270a exceeds an intensity threshold, e.g., 50%. The intensity threshold may be specified relative to (e.g., as a percentage of) the transmitted light intensity. Thus, the computer 110 may identify the dirty area 300 upon determining that more than 50% of the light transmitted by the photodiode transmitter 260 is received by the photodiode sensor 270a. In one example, the intensity threshold may be specified based on a distance $d_1$ between the transparent layer 200 and the reflective layer 210, and distances $d_2$, $d_3$ of the photodiode sensor 270a, 270b from the photodiode transmitter 260, etc. An intensity of the reflected light beam 310 may be reduced at each reflection, and therefore a longer distance to the transmitter 260 may warrant a lower threshold. For example, a first intensity threshold for the photodiode 270a may be greater than a second intensity threshold of the photodiode sensor 270b because a shorter distance $d_2$ may result in higher intensity of received light. Therefore, exceeding a higher intensity threshold at the photodiode sensor 270a should result in detecting a dirty area 300. In one example, the intensity thresholds have a proportional relationship to the distances $d_2$, $d_3$. Additionally or alternatively, the intensity thresholds may be identified using empirical test results, as discussed with reference to Table 3.

The computer 110 may be programmed to identify the dirty area 300 by determining a location and/or dimensions of the dirty area 300 on the exterior surface 170. In one example, locations of the smudge detectors 150 may be stored in a computer 110 memory, e.g., front right bumper corner, left rear bumper corner, etc. The computer 110 may be programmed to determine the location of the dirty area 300 based on determining from which smudge detector 150 photodiode sensors 270 the light intensity data is received (as discussed concerning FIGS. 4-5).

The computer 110 may be programmed to identify a material covering the dirty area 300 based on a wavelength and/or an intensity of the received reflected light beam 310.

For example, the computer 110 may be programmed to detect a dirty area 300 upon determining that the received intensity is greater than a first threshold, e.g., 50%. The computer 110 may be further programmed to determine that the dirty area 300 is covered with a solid material, e.g., dirt, upon determining that the received intensity exceeds a second threshold, e.g., 75%. Additionally or alternatively, upon determining that the intensity is between the first and second thresholds, e.g., 50% and 75%, the computer 110 may be programmed to determine that the dirty area 300 is covered with a material, e.g., dust, that partially lets the light beam 280 to pass through (i.e., only partially reflects the optical signal back to the reflective surface 220).

Figure 4:
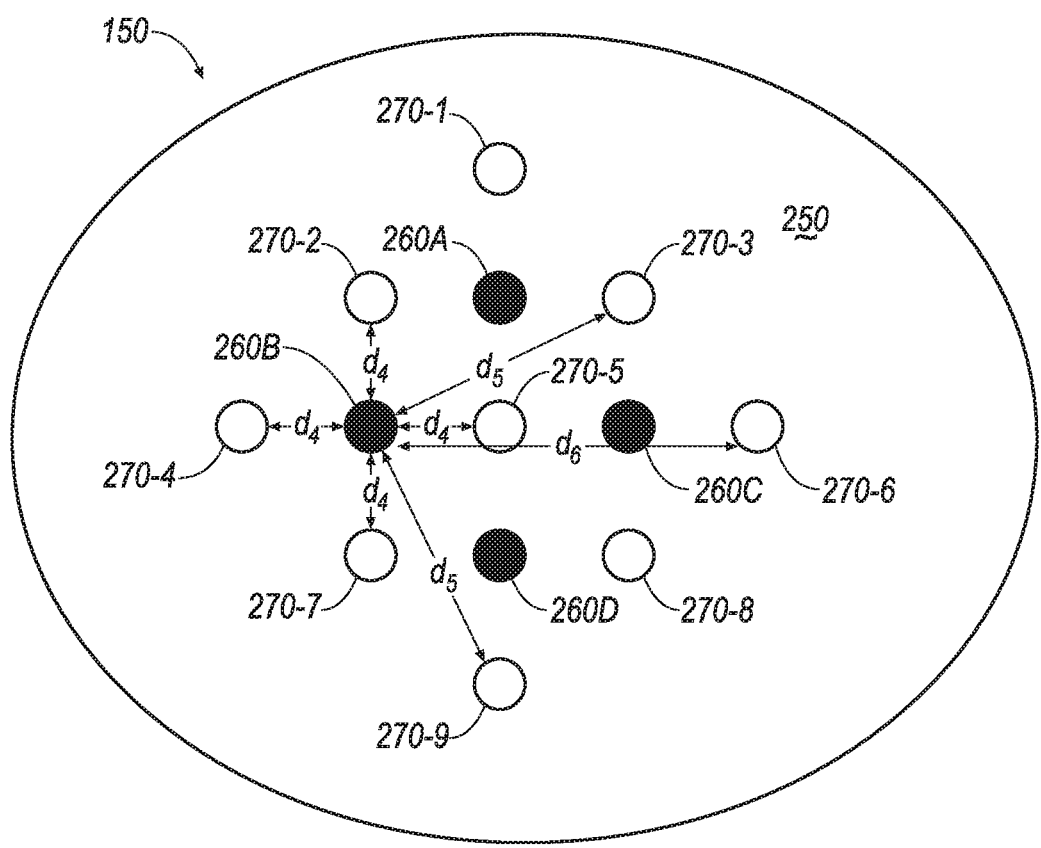
FIG. 4 is a top view of a smudge detector with multiple photodiode transmitters and photodiode sensors.

FIG. 4 illustrates a top view of an example smudge detector 150. The computer 110 may be programmed to actuate the photodiode transmitters 260A-260D asynchronously, an intensity threshold associated with each of the photodiode sensors 270-1 to 270-9, is based on a location of the photodiode sensor 270 relative to a currently active photodiode transmitter 260, as discussed below with reference to Table 2.

In the present context, "asynchronously" means that not all, and possibly not any, of the photodiode transmitters 260 of a photodiode transmitter 260 are actuated simultaneously. For example, the computer 110 may be programmed to actuate a first group of the photodiode transmitters 260, to determine first intensities of received reflections of optical signals outputted by the first group of the photodiode transmitters 260. The computer 110 may be programmed to then actuate a second group of the photodiode transmitters, to determine second intensities of received reflections of optical signals outputted by the second group of the photodiode transmitters 260, and to determine dimensions of the dirty area 300 based on the first and second intensities.

In one example, the photodiode transmitters 260 and the photodiode sensors 270 may be arranged in a circular pattern. For example, as shown in FIG. 4, the photodiode sensors 270-1, 270-2, 270-3, 270-5 have same distances $d_4$ relative to the photodiode transmitter 260A. In other words, the photodiode sensors 270-1, 270-2, 270-3, 270-5 are located on a circle with a center at the photodiode transmitter 260A. Additionally or alternatively, the photodiode transmitters 260 may be arranged in a circular pattern.

TABLE 1

|  | Transmitter 260A | Transmitter 260B | Transmitter 260C | Transmitter 260D |
|---|---|---|---|---|
| Sensor 270-1 | 4 | 2 | 2 | 1 |
| Sensor 270-2 | 4 | 3 | 2 | 1 |
| Sensor 270-3 | 4 | 2 | 3 | 1 |
| Sensor 270-4 | 3 | 3 | 1 | 1 |
| Sensor 270-5 | 4 | 3 | 3 | 2 |
| Sensor 270-6 | 3 | 1 | 3 | 1 |
| Sensor 270-7 | 2 | 2 | 1 | 2 |
| Sensor 270-8 | 2 | 1 | 2 | 2 |
| Sensor 270-9 | 1 | 1 | 1 | 2 |

As discussed below with reference to Table 1 and FIG. 5, the computer 110 may be programmed to determine at least three intensities of received optical signals based on data received from at least three of the photodiode sensors 270, and to identify dimensions of the dirty area 300 based on the at least three intensities of the received optical signal. Additionally or alternatively, the computer 110 may be programmed to identify a location of the dirty area 300 based on determined intensities of reflected optical signal from at least three of the plurality of the photodiode sensors.

Table 1 shows an example of received intensities from the photodiode sensors 270-1 to 270-9 based on asynchronously actuating the transmitters 260A-260D to transmit an optical signal. Each column may show the intensities received while a transmitter at the top of the column is activated. For example, the column labeled with "Transmitter 260A" shows all intensities received at the sensors 270-1 to 270-9 during an actuation of the transmitter 260A. In the example of Table 1, the received intensities are specified in numeric format, e.g., 1 (low intensity), 2 (medium intensity), 3 (medium high intensity), 4 (high intensity). As discussed above, the received intensities, as an example, can be specified as a percentage of the transmitted light. For example, the levels 1, 2, 3, 4 may correspond to 20%, 40%, 60%, and 80% of the light intensity transmitted, e.g., by the transmitter 260A.

Figure 5:
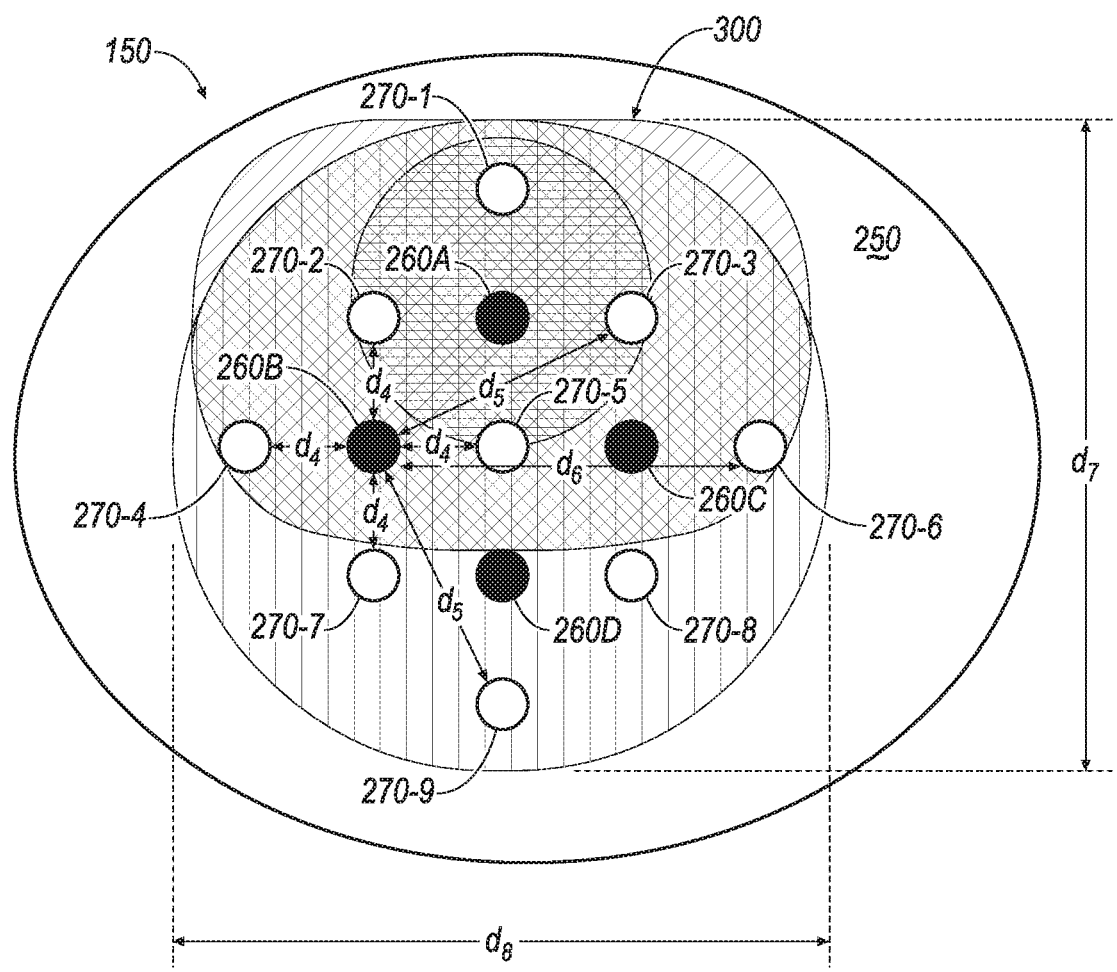
FIG. 5 is a top view of the smudge detector of FIG. 4 with a dirty area.

With reference to Table 1 and FIG. 5, in one example, the computer 110 can be programmed to in a sequence actuate each of the photodiode transmitter 260A, 260B, 260C, 260D, to determine the received intensities of each of the photodiode sensors 270 for each of respective actuation of a transmitter 260, and to identify dimensions and/or location of the dirty area 300 based on the received intensities. For example, the computer 110 may be programmed to actuate the photodiode transmitters 260A, 260B, 260C, 260D each for 100 milliseconds, and each when it is the only one actuated. As shown in FIG. 5, the example dirty area 300 is widespread over the smudge detector 150; however, the example dirty area 300 has different shades, e.g., different depth of material on the outer surface 250. Therefore, different intensities of received light in different portions of the dirty area 300 can be distinguished in Table 1 (e.g., different received intensities at sensors 270-1 to 270-9 upon actuation of the transmitter 260A). As shown in Table 1, the intensities received from the photodiode sensors 270-1, 270-2, 270-3, 270-5 during actuation of the transmitter 260A are greater than the intensities from other sensors 270. Thus, the computer 110 may be programmed to determine that the dirty area 300 is more obstructive, e.g., dirt, ice, etc. in a location around the transmitter 260A (e.g., a circular area with a diameter $d_4$) compared to, e.g., a location around the photodiode transmitter 260D that may be covered by less obstructive material, e.g., dust, rain, etc. (as shown with different shades of dirty area 300 in FIG. 5).

Additionally or alternatively, the computer 110 may be programmed to determine dimensions $d_7$, $d_8$, which define the dirty area 300, based on the received intensities. For example, the computer 110 may be programmed to determine dimensions of the dirty area 300 by determining dimensions of an area where the received intensities exceed an intensity threshold "1" (low intensity). With reference to Table 1, the computer 110 may detect a circular portion of the dirty area 300 with a radius $d_4$ centered at the location of the photodiode transmitter 260A.

TABLE 2

|  | Transmitter 260A | Transmitter 260B | Transmitter 260C | Transmitter 260D |
|---|---|---|---|---|
| Sensor 270-1 | 2 | 1 | 1 | 0 |
| Sensor 270-2 | 2 | 2 | 1 | 1 |
| Sensor 270-3 | 2 | 1 | 2 | 1 |
| Sensor 270-4 | 1 | 2 | 0 | 1 |
| Sensor 270-5 | 2 | 2 | 2 | 2 |
| Sensor 270-6 | 1 | 0 | 2 | 1 |
| Sensor 270-7 | 1 | 2 | 1 | 2 |

TABLE 2-continued

|  | Transmitter 260A | Transmitter 260B | Transmitter 260C | Transmitter 260D |
|---|---|---|---|---|
| Sensor 270-8 | 1 | 1 | 2 | 2 |
| Sensor 270-9 | 0 | 1 | 1 | 2 |

As discussed above, the intensity thresholds may be specified based on a combination of each photodiode sensor 270 and each photodiode transmitter 260. Table 2 shows an example intensity threshold table. An intensity threshold for a photodiode sensor 270 may be based on a location of the photodiode sensor 270 relative to a currently active photodiode transmitter 260. For example, a first, second, third, and fourth intensity threshold may be specified for the photodiode sensor 270-3 based on whether each of the photodiode transmitters 260A, 260B, 260C, 260D is active (see the row of Table 2 labeled "Sensor 270-3"). Additionally or alternatively, the intensity thresholds may be specified based on currently active group of more than one photodiode transmitters 260. For example, an intensity threshold may be specified for each of the photodiode sensor 270-1 to 270-9 based on whether a first group including the photodiode transmitters 260A, 260B or a second group including the photodiode transmitters 260C, 260D are actuated. In such example, Table 2 may be modified to have a column labeled "Transmitters 260A, 260B actuated" and a second column labeled "Transmitters 260C, 260D actuated."

The computer 110 may be programmed to store the intensity threshold table, e.g., Table 2, in a computer 110 memory, including a plurality of intensity thresholds, to look up an intensity threshold for a photodiode sensor 270 based on a combination of a currently active photodiode transmitter 260 and the respective photodiode sensor 270. For example, relative to an activated photodiode transmitter 260B, a distance $d_4$ of the photodiode sensors 270-2, 270-4, 270-5, 270-7 is less than the distance $d_5$ of photodiode sensors 270-1, 270-3, 270-8, 270-9, and the distance $d_5$ is less than a distance $d_6$ to the photodiode sensor 270-6. Accordingly, the intensity thresholds of the column labeled with "Transmitter 260B" are specified at least in part based on the distances $d_4$, $d_5$, $d_6$. Additionally, the computer 110 may be programmed to activate each of the photodiode transmitters 260, and to determine for each of the photodiode sensors 270 whether the received intensity at the respective photodiode sensor 270 based on the currently active photodiode transmitter 260 exceeds an associated intensity threshold (e.g., based on Table 2). The computer 110 may be further programmed to determine the dimensions, location, etc., of the dirty area 300 based on the determined photodiode sensors 270 which received intensities exceeding the associated threshold(s). In one example, the computer 110 may be programmed to fit a shape of the dirty area 300, e.g., using curve fitting techniques, based on locations of covered photodiode sensors 270. "Covered" means received intensity exceed the associated intensity threshold.

TABLE 3

| Non-controllable parameters | Description |
|---|---|
| Transmittance of transparent layer | An effectiveness of the transparent material in transmitting light beams to exterior of the vehicle, measured in percentage, e.g., 90% for N-BK7 glass. |
| Refractive indices | The refractive indices of the transparent material and a medium, e.g., air, between the transparent layer and the reflective surface, measured in a unitless numeric value, e.g., a refract index of approximately 1.6 for clear glass. |
| Reflectivity (or reflectance) | A reflectivity of the reflective surface measured in a percentage unit, e.g., a reflectance of 90% for aluminum or copper. |
| Adjustable parameter | A distance between the reflective surface and the transparent layer measured in centimeters, e.g., 0.2 cm. |
| Distance between photodiode transmitters and/or sensors | Distances between photodiode transmitters and/or between the photodiode transmitters and the photodiode sensors receiving the light intensity of the transmitted light beam of the transmitters measured in centimeters, e.g., 1, 2, 3 cm for distances $d_4$, $d_5$, $d_6$. |

As discussed above, the intensity thresholds may be identified using empirical test results. With reference to Table 3, the computer 110 and/or a lab computer may be programmed to identify the intensity thresholds based on multiple non-controllable parameters. A "non-controllable" parameter (sometimes also refer to as a "static parameter" because non-controllable parameters do not change once a design is implemented) is a parameter that is typically fixed based on a design of a system, e.g., transmittance of the transparent layer 200 may be fixed for a manufactured vehicle 100 including the smudge detector(s) 150, i.e., has been determined or chosen at a time of designing the vehicle 100. A parameter is a value measuring a physical property such as a distance, refractive index, etc. related to a component of the vehicle 100. The computer 110 may be programmed to identify the intensity thresholds by actuating each of the photodiode transmitters 260 and to determine first received light intensities at the photodiode sensors 270. Then, an obstructive material is applied (e.g., dust) on the outer surface 250, and the computer 110 actuates each of the photodiode transmitters 260, and determines second received light intensities at the photodiode sensors 270. This process may be repeated and each time a different obstructive material, different thickness, etc. is applied on the outer surface 250.

The computer 110 and/or lab computer may be programmed to determine light intensity thresholds based on the collected data, e.g., using response surface methodology. Response surface methodology (RSM) is a collection of mathematical and statistical techniques for empirical model building. In the example above, using RSM, a relationship is determined between an input, e.g., an intensity of the light beam 280, the non-controllable parameters, and an output, e.g., intensity of the received light at the photodiode sensors 270, based on collected data related to different experiments. In one example, a plurality of intensity thresholds may be determined for each of a plurality of different obstructive materials, e.g., dirt, dust, ice, etc. Additionally or alternatively, the computer 110 may be programmed to identify non-controllable parameters to improve a detection of dirty area 300. As an example, a lab computer may be programmed to identify optimized distances $d_4$, $d_5$, $d_6$ between the photodiode transmitters 260 and the photodiode sensors 270 to maximize a change of received light intensity based on existence versus non-existence of an obstructive material on the outer surface 250. In other words, the smudge detectors 150 may be designed based on the static parameter established based on the results of the RSM model in order to improve a detection of the smudge detector 150. Thus, the smudge detectors 150 may be designed and manufactured based on the optimized static parameters.

Processing

Figure 6A:
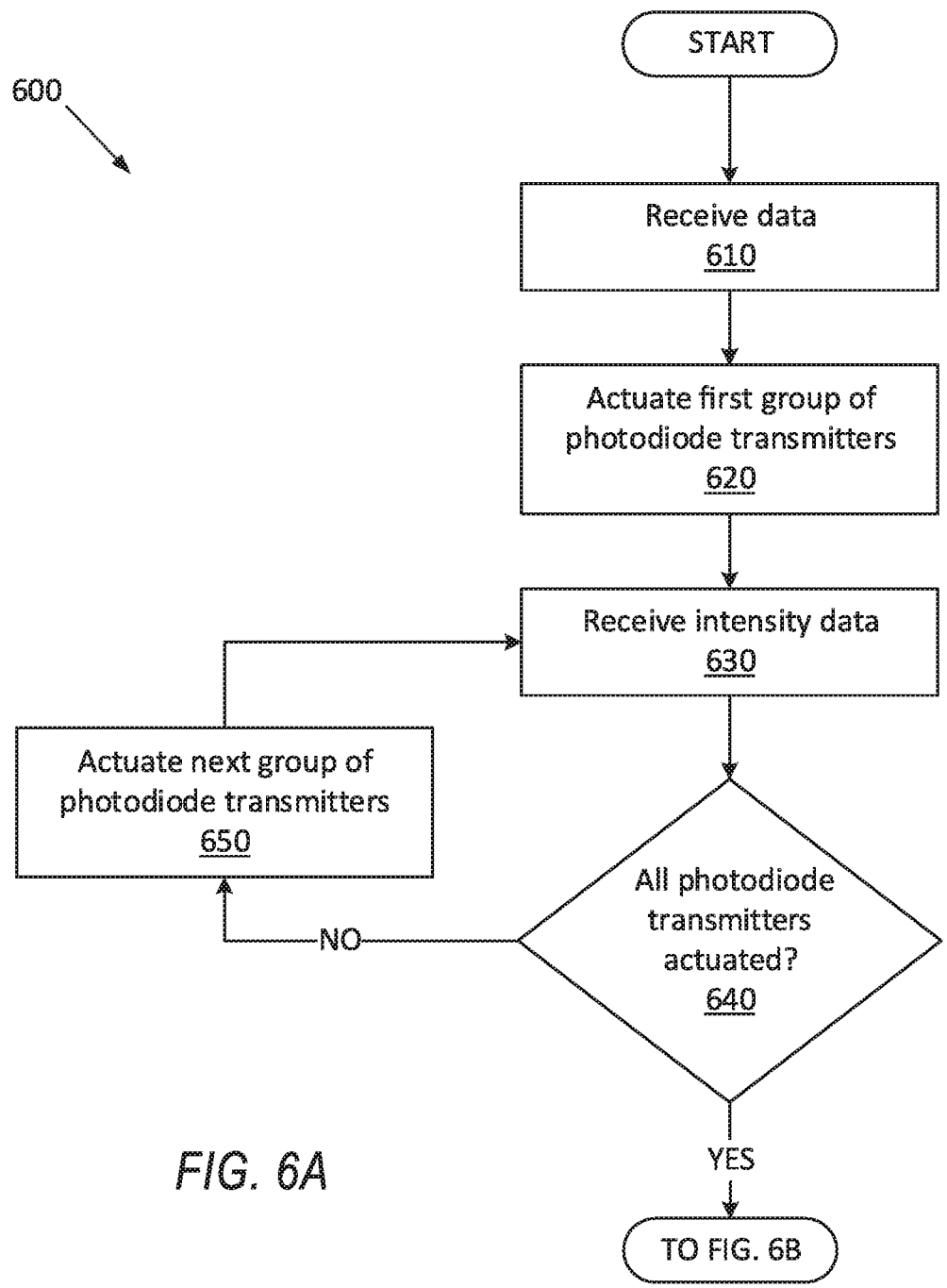
FIGS. 6A-6B illustrate a flowchart of an exemplary process for operating the smudge detector.
Figure 6B:
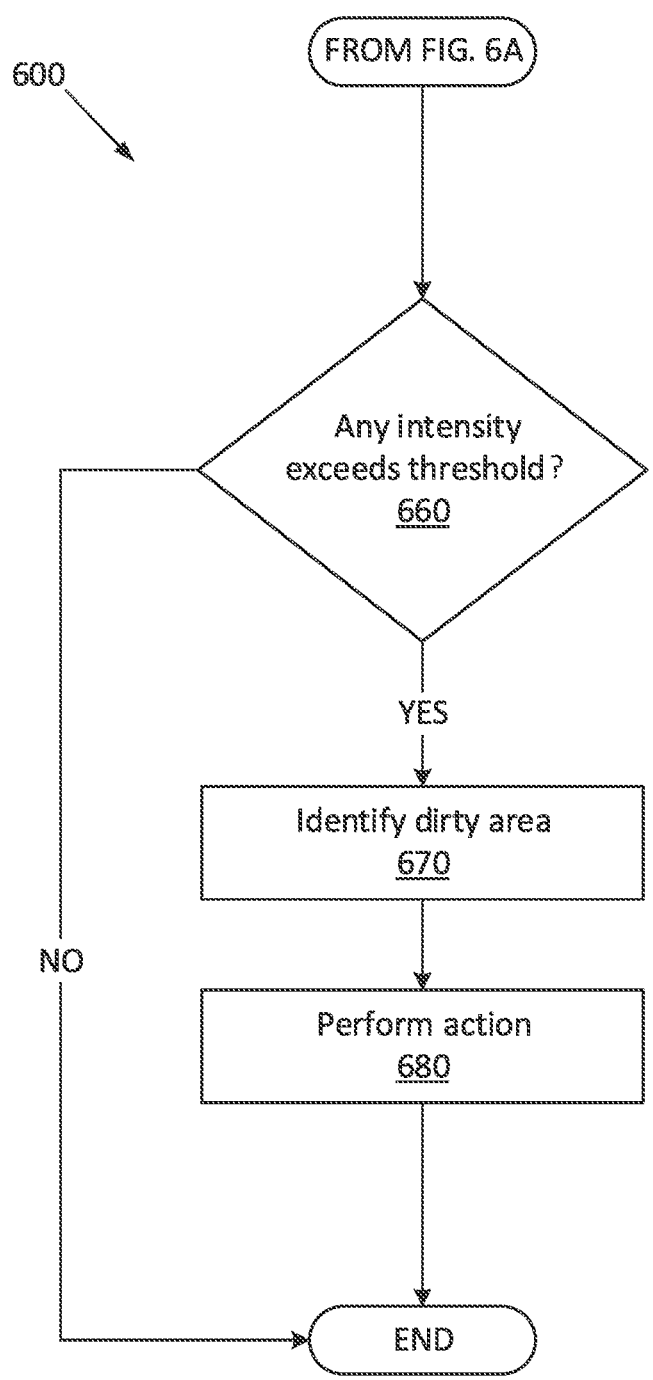

FIGS. 6A-6B illustrate a flowchart of an exemplary process 600 for operating the smudge detector. For example, the vehicle 100 computer 110 can be programmed to execute blocks of the process 600.

With reference to FIG. 6A, the process 600 begins in a block 610, in which the computer 110 receives data, e.g., the location of smudge detectors 150 on the exterior surface 170, the intensity thresholds, etc. For example, the computer 110 may receive and/or store the intensity thresholds in form of a table, e.g., as shown in Table 2.

Next, in a block 620, the computer 110 actuates a group of one or more photodiode transmitter(s) 260 to output an optical signal, e.g., an infrared light beam 280. In one example, the computer 110 actuates the photodiode transmitter 260A, as shown in FIG. 3.

Next, in a block 630, the computer 110 receives intensity data from the photodiode sensors 270. For example, the computer 110 may be programmed to receive intensity data from each of the photodiode sensors 270-1 to 270-9. In one example, the computer 110 stores the received intensity data from each of the photodiode sensors 270 in a table, e.g., as shown in Table 1. The computer 110 may be programmed to store data in each column of the table based on currently active photodiode transmitter 260. By storing data in each column of the table, the computer 110 may later determine whether the respective photodiode transmitter 260 has been actuated.

Next, in a decision block 640, the computer 110 determines whether all photodiode transmitters 260 of the smudge detector 150 are actuated. The computer 110 may be programmed to determine whether all photodiode transmitters 260 are actuated by verifying whether intensity data associated with activating each of the photodiode transmitters 260 is stored in a computer 110 memory. If the computer 110 determines the plurality of photodiode transmitters 260 are actuated, then the process 600 proceeds to a decision block 660 (see FIG. 6B); otherwise the process 600 proceeds to a block 650.

In the block 650, the computer 110 actuates a next group of one or more of the photodiode transmitters 260 that has not been actuated. For example, the computer 110 may be programmed to actuate the photodiode transmitter 260B. Following the block 650, the process 600 proceeds to the block 630.

With reference to FIG. 6B, in the decision block 660, the computer 110 determines whether any of the stored intensities exceed an intensity threshold. In one example, the computer 110 compares the stored intensity data, e.g., of Table 1, to the intensity thresholds, e.g., of Table 2. To determine whether a stored intensity exceeds the threshold, the computer 110 may look up an associated threshold for each of the intensity data based on a combination of the photodiode sensor 270 and the activated photodiode transmitter 260. In another example, the computer 110 may be programmed to compare each of the stored intensities to a same intensity threshold. If the computer 110 determines that at least one of the received intensities exceeds, e.g., an associated intensity threshold, the process 600 proceeds to a block 670; otherwise the process 600 ends, or alternatively, returns to the block 610, although not shown in FIGS. 6A-6B.

In the block 670, the computer 110 identifies a dirty area 300 (e.g., as shown in FIG. 5). The computer 110 may be programmed to determine a location, dimensions, etc. of the dirty area 300 based on the stored intensity data, e.g., Table 1. Additionally or alternatively, the computer 110 may be programmed to determine a material of the dirty area 300 based on the stored intensity data.

Next, in a block 680, the computer 110 performs an action based on the identified dirty area 300. In one example, the computer 110 may be programmed to schedule a trip to a car wash and navigate the vehicle 100 to the car wash. In another example, the computer 110 may be programmed to output information to the vehicle 100 HMI 140 including a location and/or dimensions of the dirty area(s) 300 on the exterior surface 170. In another example, the computer 110 may be programmed to determine, based on the location of identified dirty area 300, whether the dirty area 300 may affect an operation of a vehicle 100 sensor 130, e.g., a LIDAR sensor 130. In one example, the computer 110 may be programmed to determine that a dirty area 300 may impair a vehicle 100 sensor 130 based on a location of the dirty area 300 and a location of the sensor 130. For example, upon determining that a distance between a dirty area 300 and a sensor 130 is less than a distance threshold, e.g., 20 centimeter (cm), the computer 110 may be programmed to perform an action, e.g., actuating a cleaner to clean the sensor 130, navigate the vehicle 100 to a car wash, navigate the vehicle 100 based on data received from other sensors 130, etc.

Following the block 680, the process 600 ends, or alternatively returns to the block 610, although not shown in FIGS. 6A-6B.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising:
a plurality of photodiode sensors spaced from one another and mounted to a reflective surface;
a transparent layer spaced from and substantially parallel to the reflective surface; and
a plurality of photodiode transmitters at least one of mounted to the reflective surface and disposed between the reflective surface and the transparent layer.

2. The system of claim 1, wherein receiving surfaces of the plurality of photodiode sensors are directed toward the transparent layer.

3. The system of claim 1, wherein the transparent layer is transparent to a wavelength of an optical signal of the plurality of photodiode transmitters.

4. The system of claim 1, wherein at least one of the plurality of photodiode transmitters and the plurality of photodiode sensors are arranged in a circular pattern.

5. The system of claim 1, further comprising a computer programmed to:
actuate at least one of the plurality of the photodiode transmitters to generate an optical signal;
determine an intensity of a received reflection of the optical signal based on data received from at least one of the plurality of the photodiode sensors; and
identify a dirty area on an outer surface of the transparent layer, wherein the outer surface is spaced from the reflective surface.

6. The system of claim 5, wherein the computer is further programmed to identify the dirty area upon determining that the determined intensity exceeds an intensity threshold.

7. The system of claim 6, wherein the computer is further programmed to actuate the plurality of photodiode transmitters asynchronously, wherein an intensity threshold associated with each of the photodiode sensors is based on a location of the photodiode sensor relative to a currently active photodiode transmitter.

8. The system of claim 5, wherein the computer is further programmed to:
determine at least three intensities of received optical signals based on data received from at least three of the plurality of photodiode sensors; and
identify dimensions of the dirty area based on the at least three intensities of the received optical signal.

9. The system of claim 5, wherein the computer is further programmed to:
actuate a first group of the photodiode transmitters;
determine first intensities of received reflections of optical signals outputted by the first group of the photodiode transmitters;
actuate a second group of the photodiode transmitters;
determine second intensities of received reflections of optical signals outputted by the second group of the photodiode transmitters; and
determine dimensions of the dirty area based on the first and second intensities.

10. The system of claim 5, wherein the computer is further programmed to identify a material covering the dirty area based on at least one of a wavelength and intensity of the received reflection.

11. The system of claim 5, wherein the computer is further programed to identify a location of the dirty area based on determined intensities of reflected optical signal from at least three of the plurality of the photodiode sensors.

12. A system, comprising:
a plurality of means for sensing light spaced from one another and mounted to a reflective surface;
a transparent layer spaced from and substantially parallel to the reflective surface; and
a plurality of means for transmitting light at least one of mounted to the reflective surface and disposed between the reflective surface and the transparent layer.

13. The system of claim 12, further comprising:
means for actuating at least one of the plurality of the photodiode transmitters to generate an optical signal;
means for determining an intensity of a received reflection of the optical signal based on data received from at least one of the plurality of the photodiode sensors; and
means for identifying a dirty area on an outer surface of the transparent layer, wherein the outer surface is spaced from the reflective surface.

14. The system of claim 13, further comprising means for identifying the dirty area upon determining that the determined intensity exceeds an intensity threshold.

15. The system of claim 14, further comprising means for actuating the plurality of photodiode transmitters asynchronously, wherein an intensity threshold associated with each of the photodiode sensors is based on a location of the photodiode sensor relative to a currently active photodiode transmitter.

16. The system of claim 13, further comprising:
means for determining at least three intensities of received optical signals based on data received from at least three of the plurality of photodiode sensors; and
means for identifying dimensions of the dirty area based on the at least three intensities of the received optical signal.

17. The system of claim 13, further comprising:
means for actuating a first group of the photodiode transmitters;
means for determining first intensities of received reflections of optical signals outputted by the first group of the photodiode transmitters;
means for actuating a second group of the photodiode transmitters;
means for determining second intensities of received reflections of optical signals outputted by the second group of the photodiode transmitters; and
means for determining dimensions of the dirty area based on the first and second intensities.

18. A computer, comprising a processor and a memory, the memory storing instructions executable by the processor to:
actuate a plurality of photodiode sensors spaced from one another and mounted to a reflective surface to sense received light; and
actuate a plurality of photodiode transmitters, at least one of mounted to the reflective surface and disposed between the reflective surface and a transparent layer, to transmit light, wherein the transparent layer is spaced from and substantially parallel to the reflective surface.

19. The computer of claim 18, further programmed to:
actuate at least one of the plurality of the photodiode transmitters to generate an optical signal;
determine an intensity of a received reflection of the optical signal based on data received from at least one of the plurality of the photodiode sensors; and
identify a dirty area on an outer surface of the transparent layer, wherein the outer surface is spaced from the reflective surface.

20. The computer of claim 19, further programmed to:
actuate a first group of the photodiode transmitters;
determine first intensities of received reflections of optical signals outputted by the first group of the photodiode transmitters;
actuate a second group of the photodiode transmitters;
determine second intensities of received reflections of optical signals outputted by the second group of the photodiode transmitters; and
determine dimensions of the dirty area based on the first and second intensities.

* * * * *